US008825012B2

(12) United States Patent
Krco et al.

(10) Patent No.: US 8,825,012 B2
(45) Date of Patent: Sep. 2, 2014

(54) USER DATA NOTIFICATION IN A MOBILE COMMUNICATIONS SYSTEM

(75) Inventors: Srdjan Krco, Dublin (IE); David Loftus, Dublin (IE)

(73) Assignee: Unwired Planet, LLC, Reno, NV (US)

( * ) Notice: Subject to any disclaimer, the term of this patent is extended or adjusted under 35 U.S.C. 154(b) by 285 days.

(21) Appl. No.: 12/676,139

(22) PCT Filed: Sep. 14, 2007

(86) PCT No.: PCT/EP2007/059730
§ 371 (c)(1),
(2), (4) Date: Mar. 30, 2010

(87) PCT Pub. No.: WO2009/033507
PCT Pub. Date: Mar. 19, 2009

(65) Prior Publication Data
US 2010/0197279 A1   Aug. 5, 2010

(51) Int. Cl.
*H04L 12/58*   (2006.01)
*H04W 4/00*   (2009.01)
(52) U.S. Cl.
USPC ................................. 455/412.1; 455/435.1
(58) Field of Classification Search
USPC ............... 455/414.1, 404.1, 404.2, 466, 519,
455/414.3, 456.1–456.6, 418, 419, 458,
455/14.1, 435.1, 509, 412.1; 370/328, 338,
370/331, 319, 320, 321
See application file for complete search history.

(56) References Cited

U.S. PATENT DOCUMENTS

2004/0015569 A1*  1/2004  Lonnfors et al. ............. 709/220
2004/0142709 A1*  7/2004  Coskun et al. ................ 455/466
2004/0203852 A1* 10/2004  Janakiraman .............. 455/456.1
2005/0043036 A1   2/2005  Ioppe et al.
2005/0128091 A1   6/2005  Ricci
2005/0245232 A1  11/2005  Jakober et al.
2005/0282518 A1* 12/2005  D'Evelyn et al. .......... 455/404.1
2007/0087759 A1*  4/2007  Theisen et al. ............. 455/456.1

FOREIGN PATENT DOCUMENTS

| DE | 199 57 651 A1 | 5/2001 |
| GB | 2 410 863 A | 8/2005 |
| GB | 2 410 863 A | 10/2005 |
| WO | 02/39692 A2 | 5/2002 |
| WO | 2004/028178 A2 | 4/2004 |
| WO | WO 2004/051976 | 6/2004 |
| WO | WO 2005/053337 | 6/2005 |

OTHER PUBLICATIONS

"Personal Emergency File in Mobile Handsets", RD489032, Jan. 2005.

(Continued)

*Primary Examiner* — Melody Mehrpour
(74) *Attorney, Agent, or Firm* — Nixon & Vanderhye P.C.

(57) ABSTRACT

Data stored about user equipment, such as mobile phones, that is stored in a Home Location Register of at least one wireless, cellular voice network communications system configured, for example, as a 3G network deployment, is augmented with supplemental information and is communicated automatically to active users in the network. The invention is particularly advantageous for mobile systems that are deployable where normal networks have been disrupted, such as among emergency personnel who need to communicate and cooperate as a group at a disaster scene. Supplemental information includes, for example, the identity of a user or device that has entered or exited the network, the function, position, rank, responsibility level, etc., that each user has, and what group the user is affiliated with.

18 Claims, 3 Drawing Sheets

(56) References Cited

OTHER PUBLICATIONS

PCT International Search Report, dated Jul. 21, 2008, in connection with International Application No. PCT/EP2007/059730.

European Examination Report mailed Oct. 11, 2012 in European Application No. 07 820 233.0-2412.

* cited by examiner

USER DATA NOTIFICATION IN A MOBILE COMMUNICATIONS SYSTEM

This application is the U.S. national phase of International Application No. PCT/EP2007/059730, filed 14 Sep. 2007, which designated the U.S., the entire contents of each of which is hereby incorporated by reference.

TECHNICAL FIELD

This invention involves mobile communications systems and in particular a system and method relating to processing of information regarding active users.

BACKGROUND

Mobile communication devices are seemingly everywhere. Indeed, one would be hard-pressed to spend much time in any urban area of the world before seeing people speaking on mobile phones, or being paged, or sending text messages or electronic mail or accessing the Internet using a "personal digital assistant," or otherwise accessing some form of communications network.

The complicated and coordinated systems that make these communications possible are, however, so generally reliable that most users in highly industrialized countries take their availability for granted. Indeed, most users are made aware of the sophisticated infrastructure behind such systems only on infrequent occasions, for example, when their mobile phone connection is lost in an area of poor coverage, or in boundary zones between cells, or they cannot connect at all because of an unusually high temporary load on the system.

Of course, reality sometimes drastically disrupts such complacency. Disasters, both natural and human-caused, often disable the communications networks many rely on. For example, mobile and fixed telephone systems are often either overloaded or disabled altogether in areas hit by earthquakes, floods, terrorist attacks, etc. Furthermore, other users, such as military personnel in the field, may not have access to the local communications network at all, or may not want to have to rely on vulnerable links to satellite ground stations.

As distressing as system disruption may often be for civilians in affected areas, it often also hinders the ability of emergency personnel to operate most effectively, which may make matters even worse. Aware of this, several companies and authorities have developed both equipment and standards for secondary, often mobile networks that are substantially self-reliant and can be deployed rapidly and are particularly suited for enabling communication between members of a group who need to coordinate work on a common task.

As just one example, in the aftermath of the destruction of New Orleans in the USA in 2005 by Hurricane Katrina, normal access was impossible to primary telecommunications systems such as fixed and mobile telephone services, the Internet, etc. In response, the Sweden-based telecommunications company Ericsson made a transportable, cellular, wireless, voice network system available to various United States authorities to enable voice and data communication between a wide array of disparate agencies operating in New Orleans, including local police, fire-fighters, the Forest Service, and security personnel, to name just a few.

In disaster or other emergency situations, there will usually be some need to prioritize access to the limited resource that such mobile systems represents. For example, each Ericsson system deployed in New Orleans had an operational radius of only about 14 km and could handle fewer than 100 active users at a time. More modern versions have greater range and capacity, but this range and capacity are still much less than, for example, a typical fixed or even mobile telephone network can provide, and some prioritization is still often beneficial or necessary. One example of prioritization might be, in descending order of priority: executive leadership and policy makers; disaster response and military command and control; public health, safety and law enforcement command; public services, utilities and public welfare; and disaster recovery.

Of course, the prioritization scheme—if any is implemented at all—will depend on the situation. Regardless of the scheme, however, in any highly stressful situation, not knowing whom one can or cannot call can have serious or at best undesirable consequences. An additional complication is that, in circumstances such as disasters, in battle zones, etc., the various members of the group who need to communicate with each will often not be known to each other in advance, but to establish communications between two members of the group using mobile telephones, at least the telephone numbers must be known.

Moreover, the roles that persons are carrying out, or their positions in some hierarchy of authority or prioritization, may be as important or even more important than who they are. For example, knowing that a particular mobile phone is associated with a paramedic as opposed to a fire fighter, police officer, search specialist, etc., or with a division commander as opposed to a line officer, will often be more important than knowing their names.

One way to provide the necessary information to the various members of the group would be to have some external information service that could provide contact information to interested parties. Even if it were possible to set up such a service in the event of disruption of established primary networks, however, relaying the retrieved contact information would still cause a delay that might be unacceptable for emergency efforts on the ground. Moreover, in the field of mobile telephony operating according to, for example, the Global System for Mobile (GSM) and Universal Mobile Telecommunications System (UMTS) standards, typically only the priority class of the mobile phone itself is stored in the network in conjunction with its International Mobile Subscriber Identity (IMSI), which is a unique number associated with the network mobile phone users—the IMSI is stored in the Subscriber Identity Module (SIM) in the phone and is transmitted by the phone to the network. This will normally not be enough information for, for example, relevant emergency personnel.

SUMMARY

The invention provides a wireless, cellular voice network and related method of operation including at least one communications system and a plurality of user equipment (UE) devices, each of which is connected to a respective one of the communications systems. Each communications system provides communication between the UE devices and includes a service node, for example a Serving GPRS Support Node in a GSM-based or 3G network, that stores data relating to an identity and a location of each UE device actively connected to the respective communications system. Each system includes a register that stores primary information about each UE device actively connected to the system.

A supplemental information system is included that receives supplemental data concerning each UE device actively connected to the one or more communications systems; causes the register to store and augment the primary information about each UE device actively connected to the system with the supplemental data about each actively connected UE device; and automatically communicates the supplemental data stored in the register, or any changes in the supplemental data, to the actively connected UE devices.

The communications systems may be configured according to the Global System for Mobile (GSM) standard, the General Packet Radio Services (GPRS), the 3G or the Universal Mobile Telecommunications System (UMTS) standard. The register in such cases is a Home Location Register (HLR) and the UE devices are mobile telephones.

The supplemental data indicates, for example, entry into or exit from the network of any of the UE devices, or a role performed by a user of each UE device, or both, or any other desired secondary information that is useful in the situation in which the invention is deployed.

The communications system(s) may be transportable, distributed, cellular, wireless, WCDMA (Wideband Code Division Multiple Access), self-contained, autonomous voice network systems that may furthermore be operationally independent of but configured to access and communicate over a Public Service Telephone Network (PSTN), or an Internet Protocol Wide-Area Network (IP WAN), or both. The embodiment of the invention primarily described is therefore particularly advantageous to provide communications especially between a well-defined community of users (for example, fire fighters, rescue workers, police officers, etc.) in such situations as natural disasters, war zones, remote operations, etc., where normal communications systems may be inaccessible.

A supplemental information system with which each of the communications systems is configured to communicate may also be provided to acquire the supplemental data from any of the communications systems and propagate it to the other communications systems for inclusion in their respective registers.

As one aspect of the invention, the HLR itself is modified so as to store and coordinate collection and dissemination of the supplemental information.

DETAILED DESCRIPTION

The invention relates to modifications to a mobile telephone network that make it particularly well-suited for use in situations where the public network has been disabled. The invention is therefore described below primarily in the context of an architecture for a distributed, cellular, wireless, self-contained, autonomous voice network system, one example of which is the transportable, WCDMA (Wideband Code Division Multiple Access) currently marketed under the name QuicLINK by Ericsson, Inc. This is merely by way of example. The principles of the invention do not require this particular system and the invention is not limited to use in disasters or combat zones; those skilled in the design of mobile telephone networks will realize how to adapt what is described here for use with analogous systems and for use in different types of situations.

Figure 1:
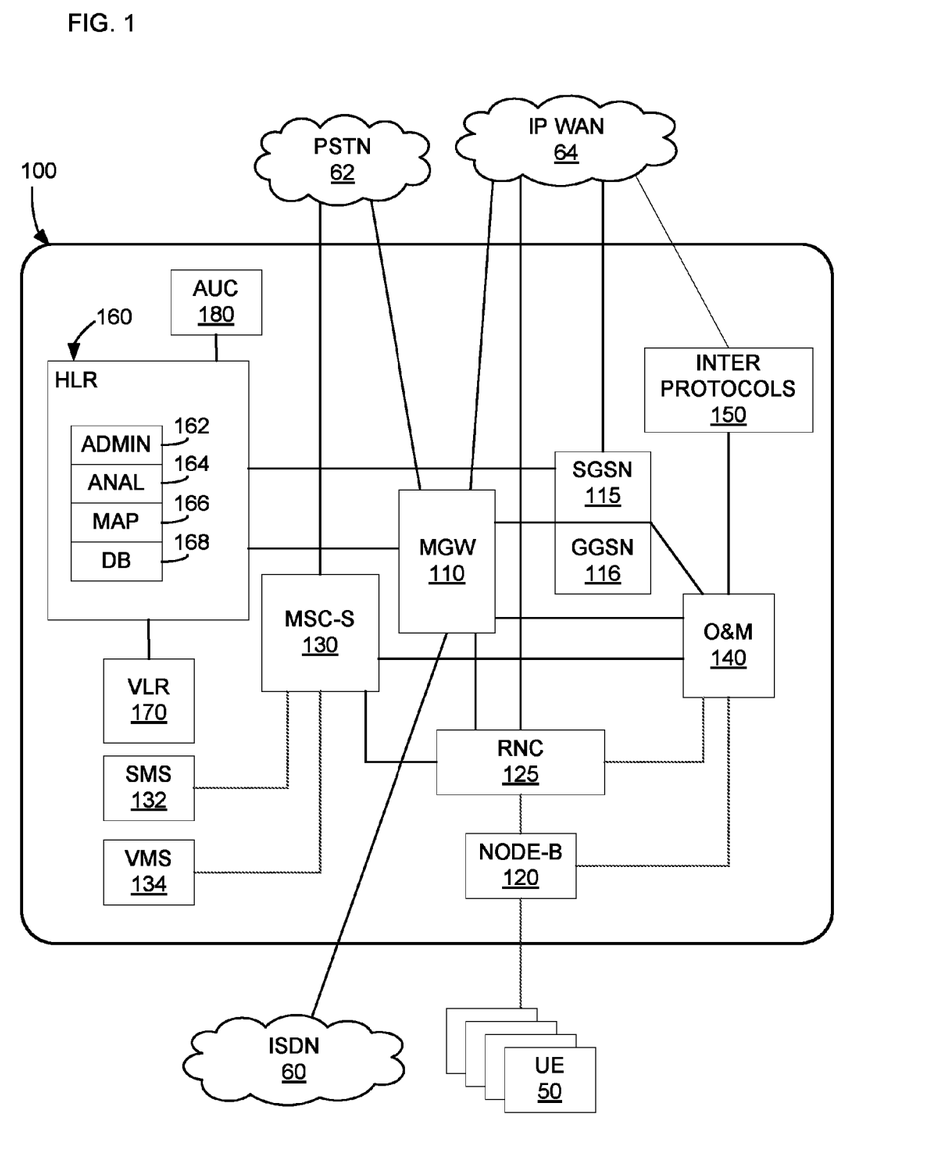
FIG. 1 illustrates some of the main system components of one example of a system architecture suitable for implementing the invention.

FIG. 1 illustrates some of the main components of a system architecture that may implement the various aspects of this invention. The illustrated architecture corresponds at least approximately to the QuicLINK architecture. As those skilled in mobile networking technology will recognize, most of the illustrated components are found in other systems, including, but not limited to, GSM systems, GPRS (General Packet Radio Services) systems, UMTS (Universal Mobile Telecommunications System) systems (one of the so-called 3G, that is, third-generation mobile systems), etc. The changes in structure or operation of the components that are modified as described below to implement this invention may be applied in such other systems as well, or in any other systems that have analogous components. The invention is described with reference to the architecture shown in FIG. 1 by way of illustration only.

One feature of a communications system that is particularly advantageous in emergency situations is that it will typically not require the complexity of a "normal," full-scale mobile telephony network; as is the case with, for example, QuicLink systems, they will generally have a reduced footprint and less capacity compared with, for example, a standard 3G network deployment. One advantage of this reduction, however, is that it may also enable the main system components to be parts of a single communications system 100, which may be made easily transportable to the places where the unit is needed; indeed, one military version (CDMA2000 R1 Version) of a QuicLink system had as its central server that weighed no more than about 6.5 kg and was in a single ruggedized laptop-sized casing that could easily be coupled to an external radio node.

The components illustrated in FIG. 1 are generally known in the art and not all of them are necessary to implement the invention. They are summarized here, however, for completeness.

User Equipment (UE) 50:

This is any device via which users interact with the rest of the system, either by voice, with non-voice data, or both. In many implementations of this invention, the UEs 50 will be mobile telephones. The UEs 50 may be any device that can communicate wirelessly with the communications system 100, however. The UEs need not be handheld, but could, for example, be fixed in a vehicle or structure, and of course UEs need not be identical. Below, only one UE is referred to as "the UE 50" merely for the sake of simplicity.

External Networks:

Although not all types of network access may be needed in actual situations in which this invention is used, many spread-spectrum, 3G, mobile telecommunications systems that operate using WCDMA (Wideband Code Division Multiple Access) are capable of accessing different types of networks. Accordingly, FIG. 1 illustrates an ISDN (Integrated Service Digital Network) 60, a Public Service Telephone Network (PSTN) 62, that is, the "normal" or primary telephone network, and an Internet Protocol Wide-Area Network (IP WAN) 64.

Media Gateway (MGW) 110: As its name implies, the MGW 110 is an interface component with the various external networks. It also acts as a protocol and data "translator" to allow communication between different ones of the external networks.

Serving GPRS Support Node (SGSN) 115:

The SGSN delivers data packets from and to the UEs within its geographical service area. Among its several other function are packet routing and transfer. The SGSN also stores certain information such as what cell a given UE is currently in, what the current VLR (see below) is, and user profiles (including IMSI and other network addresses) of users currently active in the region of operation of the communications system.

Gateway GPRS Support Node (GGSN) 116:

The GGSN 116 is an interface between a GPRS backbone network and external packet data networks such as the IP WAN 64. It converts packets coming from the SGSN into the appropriate packet data protocol and sends them out on the corresponding packet data network. It also converts addresses of incoming data packets to the GSM address of the destination user; the packets are then sent to the SGSN currently handling that user. The GGSN further assigns IP addresses and acts as a default router for the UE 50.

Node-B 120:

Node-B is a term used to denote what, in some other systems, is called the Base Transceiver Station (BTS), although, unlike in pure GSM base stations, Node-B typically uses WCDMA as its air transport technology. Node-B 120 typically comprises power amplifiers, batteries, one or more antennas and radio frequency transmitters and the receivers, which form the direct contact components with the UEs 50, and so on. Typically, UEs cannot communicate directly with each other, but rather all such communication takes place via a communications system 100, with the Node-B 120 acting as the hardware gateway.

Radio Network Controller (RNC) 125:

The RNC 125 controls the Node-B 120 and manages the physical wireless resources (for example, radio frequency hopping, power control, and handoffs). Depending on the system, the RNC 125 may also be the component that encrypts and decrypts data that passes between the Node-B 120 and the UE 50.

Mobile Switching Center Server (MSC-S) 130:

The MSC-S 130 acts as a form of advanced telephone exchange that provides network switching functions and GSM services to the mobile phones roaming within the area that it serves, such as voice, data and fax services, as well as well as Short Message Service (SMS) 132, that is, text messaging and Voice Messaging Service (VMS) 134.

Operation & Management (O&M) module 140:

This component is typically included as an operator-accessible console to allow control and monitoring of the rest of the system.

Figure 2:
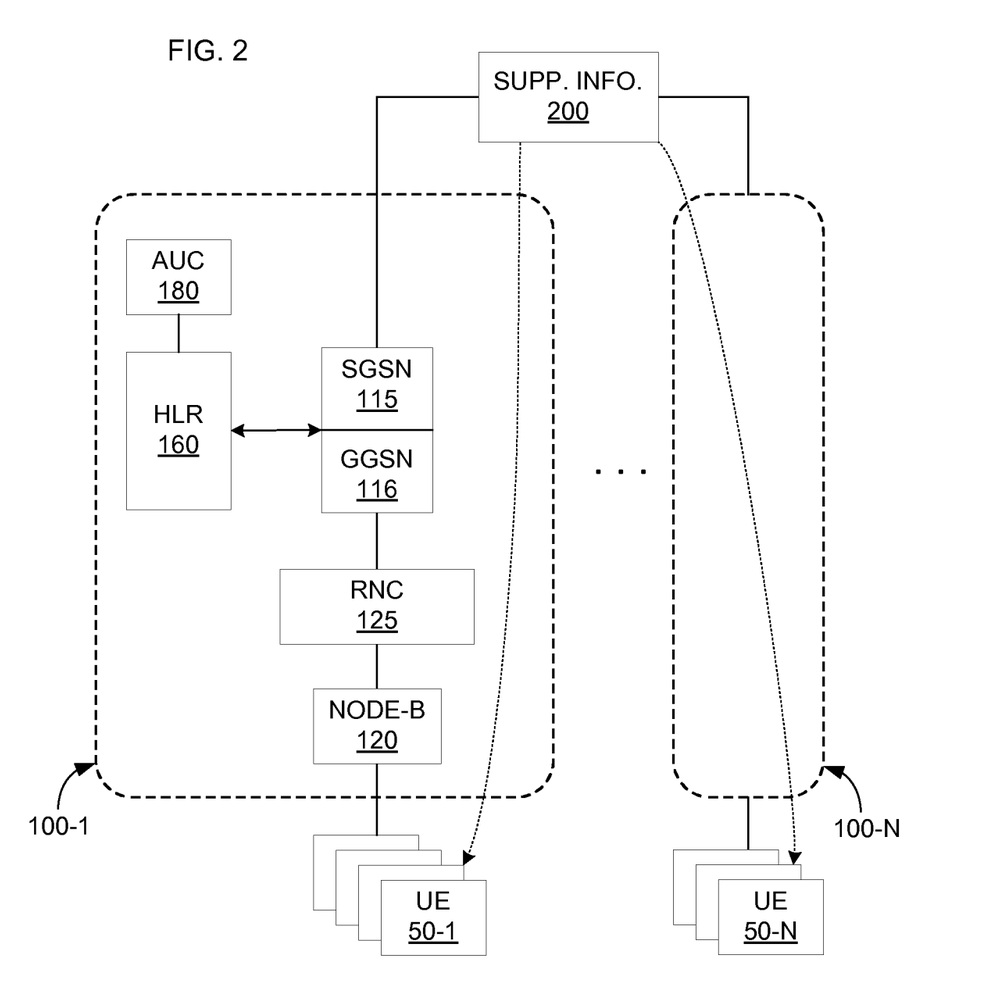
FIG. 2 shows a connected group of communications systems, each configured generally as the system shown in FIG. 1.

Inter-Protocol 150:

If the communications system 100 is to be coordinated with one or more others in a larger framework), then this component may be used to handle the inter-system communication using any suitably chosen protocol. FIG. 2 illustrates, for example, a group of communications systems 100-1, . . . , 100-N, each with its own associated set (which may be empty) of users UE-1, . . . , UE-N currently actively associated with it.

Home Location Register (HLR) 160:

The Home Location Register (HLR) is a real-time mobile telecommunication node that serves as the primary database repository of subscriber information that is used for control and intelligence within GSM/GPRS and WCDMA networks, with analogs in other types of networks. Among the many tasks of the HLR are that it manages mobile subscriber profiles, subscriber location and activity, and handles supplementary services.

In the illustrated embodiment of the invention, the HLR 160 is co-located with the MSC 130. Since the HLR functions essentially as a local server for other system components, this co-location is advantageous for systems that are preferably as compact as possible, such as those deployed in disaster areas. Co-location is not required by this invention, however.

FIG. 1 illustrates some of the components or sub-system that are usually included in the HLR to perform various types of functions, namely, an administration component 162, an analysis component 164, a Mobile Application Part 166, and a database 168.

The administration component 162 handles commands given by the operator to connect mobile station subscribers and definition of their corresponding subscriber data. This component also may comprise the interface with an Authentication Center 180 (see below).

The analysis component 164 handles the analysis of mobile station subscriber numbers (IMSI into MSISDN, and vice versa.) forwarded-to numbers and GSM/WCDMA entity addresses.

The Mobile Application Part (MAP) 166 receives messages and makes sure that the appropriate action is taken, for example, to ensure that messages are delivered to the proper destination. The MAP may also include such features as security to ensure that a requested action is permitted according to pre-stored criteria.

As a primary system data repository, the HLR 160 contains the details of each UE 50 that is authorized to use the core network over which the system operates, such as the GSM core network. The HRL 160 typically stores in its data base 168, for example, the details of every SIM card issued by the mobile telephone phone operator; the HLR records are often indexed using IMSIs as a key. The HLR 160 may also store such information as the current VLR and SGSN addresses and locations of each UE 50 address. The HLR 160 is primarily responsible for managing location updates as UEs roam around. In short, the HLR contains and manages information about the current location of each of its UEs and the services they are authorized to access. When a UE 50 moves from one location area (LA) to another, the HLR 160 retrieves information about what cell the UE is in and sends data identifying that UE to the corresponding VLR and/or SGSN when the UE first roams into the new LA. The HLR 160 also sees to it that UE information is removed from a VLR when the UE roams out of the LA corresponding to that VLR.

Some of the information typically stored in the HLR in the context of mobile telephony includes, for each mobile telephone:

The main Mobile Subscriber ISDN Number (MSISDN) and IMSI of the device. The MSISDN is what most think of as the "phone number" and generally has a format such as [CC, NDC, SN], where CC is the country code (such as 352 for Ireland, 46 for Sweden, etc.), NDC is the National Destination Code (similar to the "area code" in the USA, or a domestic regional code such as 031 for the area of Goteborg in Sweden), and SN is the subscriber's unique.

Permanent Subscriber Data such as a password, a Category, Operator Determined Barring (ODB) data, subscription information, etc.

Supplementary Service Data such as the status of such Supplementary Service, forwarding information, other passwords, etc.

Location Data such as the VLR address (see below), a Mobile Station Roaming Number (MSRN), the number to the home system's MSC 130, the identity of the local MSC, etc As a controlling node in the overall system, the HLR 160 interfaces with several of the other components for certain tasks; typically, communication is via signalling, that is, no speech connections are usually required or established to the HLR. For example, the HLR may be interrogated for terminating SMS messages or calls and the HLR may use the SMS component 132 and the MSC 130 to generate an alert when a subscriber is reachable again after an unsuccessful short message transfer.

Visitor Location Register (VLR) 170:

The VLR 170 is a temporary database of the users (UEs) that have roamed into the particular area which it serves. The data stored in the VLR 170 is normally input from either the HLR 160 or the MSCS 130. VLR data typically includes such information as the IMSIs and telephone numbers of the UEs 50 and the HLR address of each UE 50. Note that some systems may not need a VLR at all. For example, current configurations of the QuicLINK networking system made by Ericsson do not include or require a VLR; instead, each system has its own HLR and HLR data is maintained identical across all QuicLINK systems in a QuicLINK community. This invention can be implemented regardless of whether a VLR is present; the VLR 170 is shown merely for the sake of completeness.

Authentication Center (AUC) 180:

The AUC 180 provides the parameters needed for authentication and encryption functions, which in turn allow verification of the subscriber's identity. In particular, the AUC 180 authenticates the SIM of each UE 50 that tries to connect to the communications system 100. If authentication is successful, the HLR 160 is allowed to manage the SIM and services associated with the newly connected user. An encryption key may also then be generated that is used to encrypt all communications between the UE 50 and, for example, the GSM core network.

Communication between the various components of the communications system 100 shown in FIG. 1 takes places according to protocols that are well known and are therefore not discussed further here.

Although the various components in FIG. 1 are shown separately, corresponding to their functions, they are not necessarily separate physical components within the communications system 100 and the functions they perform as summarized above may be carried out or shared by other components instead. For example, the SSGN 115 and GGSN 116 are usually so closely related that they are shown in FIG. 1 as joined components; in fact, their two functions may in practice be carried out by a single component.

In FIG. 2, an additional network component—a supplemental information system 200—is shown, with which each of the group (which may have any number of members, including only a single member) of communications systems 100-1, ..., 100-N may communicate using any common protocol. The supplemental information system 200 may be any system that is able to acquire (from the communications systems 100-1, ..., 100-N directly, and/or by input from an operator using any known means) and store the supplemental information described below, and propagates this information to the communications systems 100-1, ..., 100-N. In many applications, the supplemental information system 200 will be a network server, which may be dedicated, allowing it be kept small, robust and portable, or part of a server or system that performs other functions as well. The only assumption is that some wireless or wired communications link can be established between the supplemental information system 200 and at least one of the communications systems 100-1, ..., 100-N.

In FIG. 2, many of the internal components of the communications system 100-1 illustrated in FIG. 1 are left out because they are well known and do not need further explanation for understanding the different aspects of this invention. Moreover, no internal components of the communications system 100-N are shown. This is merely for the sake of simplicity. The components of all the communications systems included in a given deployment of the invention can be assumed to be present in and the same as or equivalent to those of the communications system 100-1. These will of course include the various computer-related hardware such as processors, bus and network interface devices, power supplies, etc., as well as volatile and non-volatile storage devices such as memory and disks that will store, among other information, the code that the processor(s) execute to carry out both normal operations and the additional procedures according to the invention.

According to one of the principles of this invention, at least one information element is introduced, via the supplemental information system 200, into the HLR 160 in addition to those primary information elements currently stored in the HLR by systems according to the prior art, such as the priority class of the user equipment itself. The additional information elements may, for example, be tied to the IMSI and stored as part of the Permanent Subscriber Data normally stored within the HLR. Two examples of such supplemental information include the role of the user of an active UE, and the fact that a particular user has entered or left the group of active users of UEs associated with any of the communications systems 100-1, ..., 100-N. Recall that this group, especially in the situations in which this invention provides the most advantage, may be relatively small, with members whose roles may be more relevant to the situations than their phone numbers. Of course, the principles of this invention may be applied to more wide-spread, less restricted systems as well.

Assume by way of example that the supplemental information includes the roles, or at least the primary roles, of users of the various UEs 50-1, ..., 50-N, and also some identifier of the group a UE is associated with. For the sake of succinctness, the term "role" as used in this Description should be understood to mean any relevant characteristic concerning the function or responsibility of a given user, which may include not only job description (fire fighter, police office, paramedic, helicopter pilot, artillery officer, etc.), but also such characteristics as position (local vs. regional, commander or policy maker as opposed to on-the-scene worker, etc.), rank, or the like. The definition of "role" will depend on the circumstances and may be chosen accordingly.

By adding this information into the HLR 160, the system will be able to deploy this information to all of the communications systems 100-1, ..., 100-N connected to the supplemental information system supplemental information system 200. For example, Subscriber Role could be added in the form of a text string (or numerical code, etc., such as Fire Fighter-1, Police Officer-2, and so on) to the Permanent Subscriber Data, and an integer (or text string, etc.) could be added to indicate a Subscriber Emergency Group. This will allow users to establish communications with each other based on often more relevant information than their phone numbers, such as that one is communicating with a paramedic and not a fire fighter. If the information is communicated using, for example, dynamic WAP/HTML pages, then receipt could efficiently be accessible only by authorized ones of the UEs.

In self-contained, small-scale WCDMA networks such as QuicLINK, service nodes such as webservers and the like can be connected while running on a standard, even portable computer such as a laptop. Therefore the information stored in the HLR can be distributed in a number of ways. As just one example, the information could be published on a webpage, which may act as the home screen on the UE. As another example, the system could send an SMS message to the UEs.

In some cases, for example when emergency personnel arrive at a scene, it may be easiest simply to give each member of the team a respective dedicated UE (such as a mobile phone) that is already configured with the user's ID, role information, etc., as need and with an updated HLR. As long as the UEs are able to communicate with the central system 100 using the proper protocols, then even non-dedicated UEs could be used as well. Especially in contexts such as where the users are military or similarly non-civilian personnel, service phones could also be adapted so that they would be readily usable with the system according to the invention while still be usable in normal circumstances over a more general network.

Even in the case of dedicated UEs, it might happen that a UE changes users. For example, a police officer may give his mobile phone to a fire fighter. As user information is stored in the HLR, a simple update of the HLR record for the phone would suffice to reflect this change. Then, for example, the new user could send an SMS message to the system 100 in the normal manner, which could trigger an automatic update of the role information in the HLR.

More or different supplemental data may of course be added to the HLR using the same mechanism. Moreover, in some contexts, less information may be needed. For example, in some contexts, only a given UE user's role may be of interest, whereas other systems or situations may benefit from having the greater level of granularity of having group information provided as well. For example, in some situations just knowing that a user is a fire fighter may suffice, but in a large-scale disaster it may be much more helpful to also know that the fire fighter is in the group in Sector Northwest.

There are different ways to trigger the provision of the supplemental information to the various communications systems 100-1, . . . , 100-N, and thus enter in into the respective HLRs 160. One way is through direct operator intervention, for example at a Network Operations Center (NOC)—the NOC tells the relevant part of the system, in particular, the communications systems 100-1, . . . , 100-N, that there is a state of emergency and that Priority access and deployment of emergency numbers should commence. NOC intervention may be by any known means, such as entering appropriate commands and information into a terminal that is associated with the supplemental information system 200 or some other system accessible to the whole network. All prioritized UEs then receive the relevant information.

Another way to trigger supplemental information retrieval is automatic—when an allowed UE connects to any one of the communications systems 100-1, . . . , 100-N, the relevant information about the newly connected user is automatically provided to all other connected UEs, and information about the other UEs is automatically provided to the newly connected UE.

Note that this latter automatic triggering option also indicates another type of supplemental information that the system can provide, namely, contact details for newly connected users, as well as information about currently connected users to a newly connected UE. Each UE will therefore be able to have a list of all existing active users in a given group (for example), as well as their contact information. Whenever a user leaves the group, that is, disconnects from the network, his information may be removed from the corresponding HLR and the supplemental information may be similarly updated in all the remaining users' UEs. Users would therefore conveniently and automatically be notified, for example, that emergency medical personnel have arrived on a scene, or are at least in the network and may be contacted on their UEs.

Figure 3:
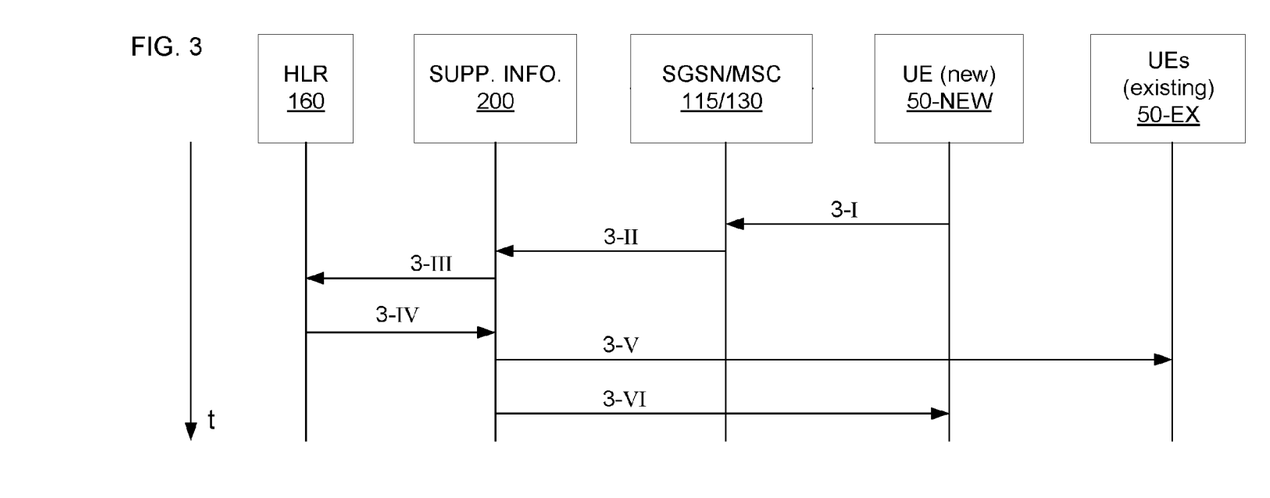
FIG. 3 illustrates an information flow between various system components when a new user enters the network.

FIG. 3 is a time-lined (time t) flow chart that illustrates one example of how the invention may be used. One scenario might be that an earthquake hits a large city and disables communications. A system incorporating the structures and principles of the invention is then deployed to the city to provide emergency communications. Emergency personnel arrive in the area and are issued mobile phones or other user equipment that can communicate over the same network. Each UE is assigned a specific role; as mentioned above, this may be by suitable encoding of its IMSI and/or MSISDN. The HLR will then contain role and group information associated with the UEs in addition to the conventional information stored in the HLR.

Assume further that one or more UEs (50-EX) are already registered and active on the network and that a new UE (50-NEW) connects. FIG. 3 illustrates the following sequence of events:

3-I: The new user (UE) 50-NEW connects to the network in the normal fashion. This is noted by the SSGN and MSC as in conventional systems.

3-II: The SSGN/MSC communicates to the supplemental information system 200 that a new user has entered the network, for example by relaying the new user's IMSI.

3-III: The supplemental information system 200 sends a request to the HLR 160 to retrieve the supplemental information about the newly entered user, for example by submitting the IMSI.

3-IV: The HLR 160 returns the requested information to the supplemental information system 200.

3-V: The supplemental information system 200 sends an update to all the already active, existing users 50-EX about the new user. This information may, as indicated above, be simply information identifying the new user, or may also include role and group, etc., information. Contact lists of each UE are then automatically updated with the new user and his role.

3-VI: The supplemental information system 200 then (or at the same time as 3-V) sends the list of active users and their roles to the new user 50-NEW.

If a searcher then for example finds a trapped body, he can open the contact list in his UE, which will list all currently active users, which may also be based on their roles in the ongoing activity.

As an alternative, if a standard UTMS system is being used, then users may enter the scene not with phones provided and provisioned by an issuing authority, but with their "own" phones, which can be accessed and updated using known protocols.

When a user leaves the network, the same basic procedures are followed as illustrated in FIG. 3, but instead of adding information and communicating information about the new user to other users, the corresponding information is deleted and other users' contact lists are updated with the exited user deleted. Of course, there will be no need to communicate supplemental information to the exiting user's UE at all, although as part of a sign-off protocol the exiting UE's contact list could be deleted if desired or otherwise marked as being out-dated.

Figure 4:
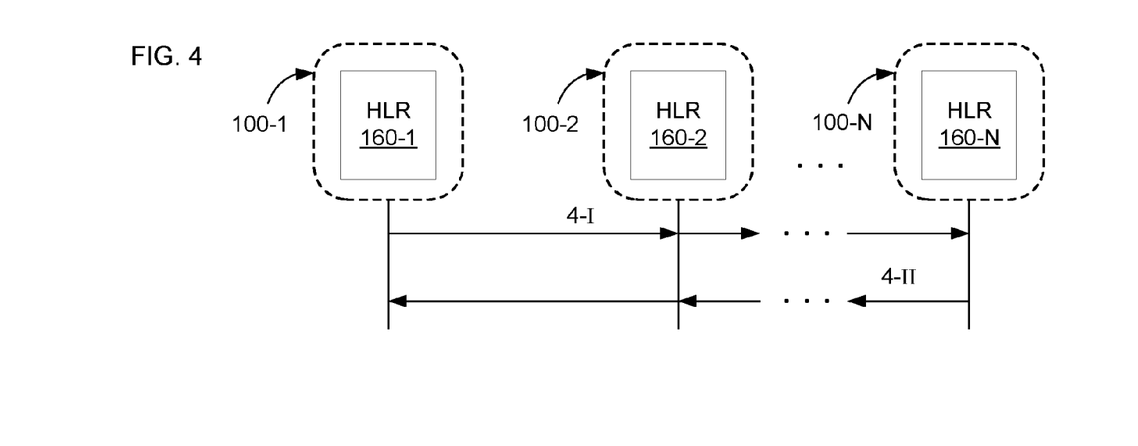
FIG. 4 illustrates user data exchange between various members of a networked community of communications systems.

As mentioned above, the supplemental information system 200 may serve any number of communications systems 100-1, communications systems 100-1, . . . , 100-2, . . . , 100-N, including only one. In implementations with more than one communications system, however, if these are linked by a network and communicate using any chosen protocol, then the HLRs can be synchronized such that all users in all systems will be able to access the same contact data. FIG. 4 illustrates this possibility, in which a change in contact information stored in the HLR 160-1 of a communications system 100-1 is transmitted (arrow 4-I) to the HLRs 160-2, ..., 160-N of other communications systems 100-2, ..., 100-N in the networked community. As arrow 4-II indicates, changes to the HLR of any of the member systems, such as to HLKR 160-N of communications system 100-N, can similarly be automatically propagated to the other systems.

As skilled telecommunications engineers will realize, the mechanisms for updating HLRs, for communicating information between internal system components, and between communications systems 100-1, ..., 100-N and UEs and each other, may generally be implemented using existing hardware. Implementing the various aspects of the invention, however, will generally entail changes and additions to the programming code that controls and directs the interaction between the SSGN/GGSN 115, 166 and the HLRs 160. The supplemental information system 200 will in many cases involve a separate hardware unit, but may also be implemented as a programming change in an existing system such as a server, as long as provision is made to receive and store the information to be communicated among UEs.

The invention claimed is:

1. A wireless, cellular voice network including:
at least one communications system and a plurality of user equipment (UE) devices, each connected to a respective current one of the communications systems, in which each communications system
provides communication between the UE devices;
includes a service node that stores data relating to an identity and a location of each UE device actively connected to the respective communications system; and
includes a Home Location Register that stores primary information about each UE device actively connected to the system; and
a supplemental information system that
receives supplemental data concerning each UE device actively connected to the one or more communications systems;
causes the Home Location Register to store and augment the primary information about each UE device actively connected to the system with the supplemental data about each actively connected UE device; and
automatically communicates the supplemental data stored in the Home Location Register or changes in the supplemental data to the actively connected UE devices.

2. The network of claim 1, wherein:
the communication systems are configured according to either the Global System for Mobile (GSM) standard, the General Packet Radio Services (GPRS), the 3G or the Universal Mobile Telecommunications System (UMTS) standard; and
the UE devices are mobile telephones.

3. The network of claim 2, wherein the node is a Serving GPRS Support Node.

4. The network of claim 1, wherein the supplemental data indicates entry into or exit from the network of any of the UE devices.

5. The network of claim 1, wherein the supplemental data indicates a role performed by a user of each UE device.

6. The network of claim 1, wherein the communications system(s) is a transportable, distributed, cellular, wireless, WCDMA (Wideband Code Division Multiple Access), self-contained, autonomous voice network system.

7. The network of claim 6, wherein the communications system(s) are operationally independent of but are configured to access and communicate over a Public Service Telephone Network (PSTN), or an Internet Protocol Wide-Area Network (IP WAN), or both.

8. The network of claim 1, further comprising a supplemental information system with which each of the communications systems is configured to communicate, and which acquires the supplemental data from any of the communications systems and propagates it to the other communications systems for inclusion in their respective Home Location Registers.

9. A method for providing cellular voice communications between a plurality of users via respective user equipment (UE) devices connected to at least one communications system, in which each communications system includes a service node that stores data relating to an identity and a location of each UE device actively connected to the respective communications system, and includes a Home Location Register that stores primary information about each UE device actively connected to the system, the method comprising:
receiving and storing supplemental data concerning each UE device actively connected to the one or more communications systems;
augmenting the primary information for each UE in the Home Location Register with the respective supplemental data; and
automatically communicating the supplemental data stored in the Home Location Register or changes in the supplemental data, to the actively connected UE devices.

10. The method of claim 9, wherein:
each communication system is configured as a transportable, distributed, cellular, wireless, CDMA (Code Division Multiple Access), self-contained, autonomous voice network system;
the UE devices are mobile telephones; and
the supplemental data indicates entry into or exit from the network of any of the UE devices.

11. The method of claim 9, wherein:
each communication system is configured as a transportable, distributed, cellular, wireless, CDMA (Code Division Multiple Access), self-contained, autonomous voice network system;
the UE devices are mobile telephones; and
the supplemental data indicates a role performed by a user of each UE device.

12. The method of claim 9, further comprising operating the communications system autonomously and independent of any existing telephone network.

13. The method of claim 12, further comprising deploying and operating the communications system when the existing telephone network is non-operational.

14. A Home Location Register that includes a database that stores primary information about each of a plurality of user equipment (UE) devices actively connected to a respective current one of at least one communications system in a communications network, wherein the node is configured to:
receive supplemental data concerning each UE device actively connected to the one or more communications systems;
store and augment the primary information about each UE device actively connected to the system with the supplemental data about each actively connected UE device; and provide for automatic communication to the actively connected UE devices the supplemental data stored in the database, or changes in the supplemental data.

15. The Home Location Register of claim 14, wherein:
the UE devices are mobile telephones.

16. The Home Location Register of claim 15, wherein the communication systems are configured according to either the Global System for Mobile (GSM) standard, the General Packet Radio Services (GPRS), the 3G or the Universal Mobile Telecommunications System (UMTS) standard.

17. The Home Location Register of claim 14, wherein the supplemental data indicates entry into or exit from the communications network of any of the UE devices.

18. The Home Location Register of claim 14, wherein the supplemental data indicates a role performed by a user of each UE device.

* * * * *

UNITED STATES PATENT AND TRADEMARK OFFICE
CERTIFICATE OF CORRECTION

| | |
|---|---|
| PATENT NO. | : 8,825,012 B2 |
| APPLICATION NO. | : 12/676139 |
| DATED | : September 2, 2014 |
| INVENTOR(S) | : Krco et al. |

It is certified that error appears in the above-identified patent and that said Letters Patent is hereby corrected as shown below:

IN THE SPECIFICATION:

Column 6, Line 27, delete "HRL" and insert -- HLR --, therefor.

Column 6, Line 64, delete "etc" and insert -- etc. --, therefor.

Column 7, Line 11, delete "MSCS" and insert -- MSC-S --, therefor.

Column 7, Line 42, delete "SSGN" and insert -- SGSN --, therefor.

Column 11, Line 18, delete "SSGN/GGSN" and insert -- SGSN/GGSN --, therefor.

IN THE CLAIMS:

Column 11, Line 29, in Claim 1, delete "system" and insert -- system: --, therefor.

Column 11, Line 38, in Claim 1, delete "that" and insert -- that: --, therefor.

Column 12, Lines 16-17, in Claim 9, delete "system," and insert -- system --, therefor.

Column 12, Line 32, in Claim 9, delete "data," and insert -- data --, therefor.

Column 13, Line 3, in Claim 14, delete "database," and insert -- database --, therefor.

Signed and Sealed this
Twenty-first Day of July, 2015

Michelle K. Lee
*Director of the United States Patent and Trademark Office*